April 13, 1965  J. SCHWARZ  3,178,221
ADJUSTABLE SPRING SEAT
Filed Sept. 24, 1962  2 Sheets-Sheet 1
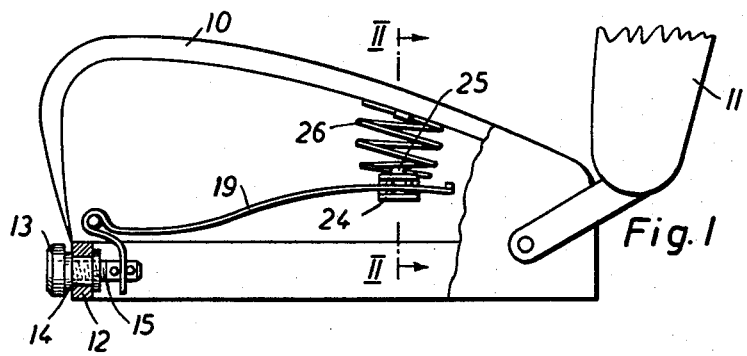
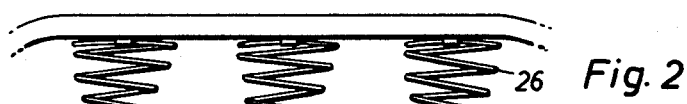
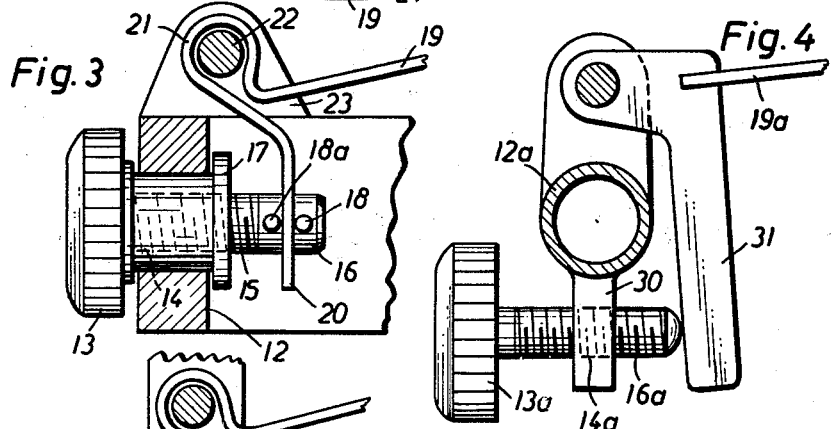
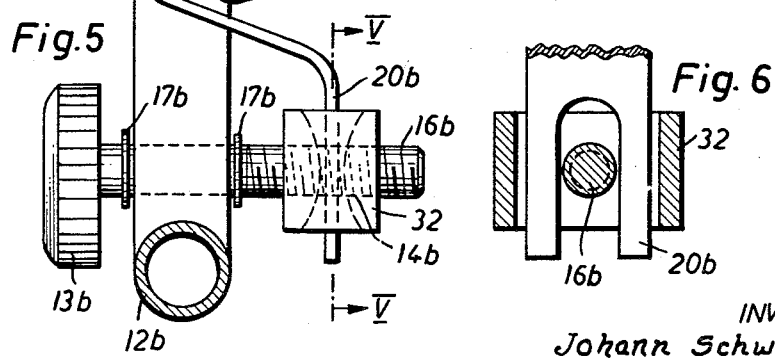
INVENTOR
Johann Schwarz
BY Lowry & Rinehart
ATTYS.

United States Patent Office 3,178,221
Patented Apr. 13, 1965

3,178,221
ADJUSTABLE SPRING SEAT
Johann Schwarz, 47 Kolner Strasse, Opladen, Germany
Filed Sept. 24, 1962, Ser. No. 225,523
7 Claims. (Cl. 297—284)

Sprung upholstered seats for office furniture, motor vehicles or the like, having an upholstered layer, for example of foam rubber with helical or undulating springs disposed under the said layer, are known per se. It is furthermore known to provide the back rest of the seat with springs, and also with devices for varying the hardness of the back rest by adjustment. Adjustment of the spring-hardness in the seat portion of the upholstered seat is, however, not known. It is desirable to be able to adapt the springing characteristics of the seat portion to changing conditions. Thus, for example, it is desirable if the seat is used by persons of considerably varying body weight. In the case of vehicle seats, adjustable seat springing is of significance during travel over streets or roads exhibiting varying degrees of roughness, for example, in the one case a well-asphalted street and in the other case a street with cobble stones. By means of adjustable springing, it is possible to produce more satisfactory vision conditions in the vehicle, to counteract tiredness in the driver and to increase comfort, and also to avoid detriment to the health due to unsatisfactory posture. In the hitherto known upholstered furniture, this was not possible.

The disadvantages of known upholstered seats are, according to the invention, obviated in that a device is proposed which permits the adjustment of the spring hardness of the seat surface, the said device having a forwardly and rearwardly movable adjustment member and at least one adjustment spring connected with the said adjustment member, for one or more plate-shaped parts acting resiliently on the seat surface. In this connection, the adjustment member can be designed as a rotatable knob arranged preferably in the center of the forward lower edge of the seat. The adjustment member can be arranged in a front seat, transverse spar or the like, the pivoting knob engaging via a screwthreaded pin, a screwthreaded sleeve, a nut or the like, the latter being arranged in such manner that it is not axially displaceable. The invention can furthermore be carried into effect in such manner that the adjustment spring has a substantially horizontal, but partially upwardly curved portion, and also an upwardly directed portion, the latter being secured in axially nondisplaceable manner on the screwthreaded pin end, preferably by means of further pins, a curved central portion of the said adjustment spring being guided about a pivoting bearing.

In this way, an adjustment device is provided which requires a relatively small number of parts, the individual parts being simple and inexpensive to manufacture. The device itself is easily accessible, simple to operate, and permits adjustment of the spring hardness over a wide range.

The invention can furthermore be so carried into effect that the curved central portion is circular and is guided around a round pivot bearing. Due to the reduction in friction, the degrees of efficiency of the adjustment is increased. According to a further embodiment, a plate retained by the adjustment spring and provided with upwardly pressing springs is displaceably mounted. In consequence of this arrangement, expedient adaptation of the plates supporting these auxiliary springs along the adjustment spring is achieved, in which connection the supporting auxiliary springs are able substantially to retain their position and not tilt over, so that their spring force is more precisely retained and untimely spring fracture due to bending or twisting is avoided. In order to diminish friction to a considerable degree in the connection between the retaining plate and adjustment spring, according to the invention a known friction or roller bearing is provided between these two parts. The friction bearing may consist of two suitable layers of friction bronze or the like with which the retaining plate is covered on the appropriate surfaces. Specific support at the point most loaded by the driver is achieved according to the invention by the measure that a supporting plate is provided between the springs and the retaining plate, in the form of a rectangle, the rectangle being designed as a narrow rectangle extending transversely of the vehicle direction.

An especially simple embodiment of the device according to the invention is possible if a screwthreaded aperture is formed in a projection on a transverse spar, there being arranged on the transverse spar a pivotal intermediate part, for example a metal angle section, which is located opposite the screwthreaded aperture and also opposite the screwthreaded pin of a pivotal knob and which receives the adjustment spring, is pivotally secured and adjustable by means of the pin. This provides a saving in respect of individual parts. Another embodiment which makes a fine adjustment of the spring hardness (or spring temper) possible provides a screwthreaded pivotal part which is axially fixed by means of abutments, such as snap rings, and carries a nut, and which is connected with the adjustment spring end. A nut is formed with a slot or the like which engages the fork-shaped end of the adjustment spring and, in so doing simultaneously engages the pin part of the pivoting part. Costs are saved and a wider adjustment range is achieved if the adjustment spring is a leaf spring. Preferably it has a single spring leaf, although it is also possible to use a plurality of spring leaves. These spring leaves can also be formed with supplementary guides or suspension points.

Diagrammatic embodiments of the subject of the invention are illustrated with reference to the accompanying drawings, wherein:

FIG. 1 shows a lateral view partially in section, of a seat cushion;

FIG. 2 shows a section taken on the like II—II of FIG. 1;

FIG. 3 is an enlarged view of the adjustment device with broken-away adjustment spring;

FIG. 4 is a second embodiment of the adjustment device with the adjustment spring partially shown;

FIG. 5 shows a third embodiment of the adjustment device, the adjustment spring being shown only in part;

FIG. 6 shows a section along the line V—V of FIG. 5; and

Figure 7:
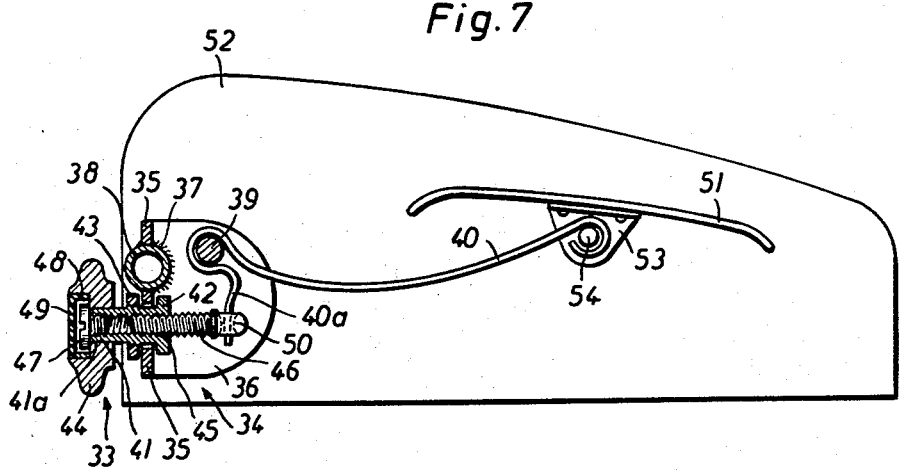
FIGS. 7 and 8 show a fourth embodiment of the adjustment device for the adjustment spring in lateral view and in top plan view.

The seat according to FIG. 1, wherein the back rest 11 is shown only in part and the springs of the seat cushion have been omitted for reasons of clarity, has the seat surface 10, which may have a foam rubber base. The adjustment device consists first of all of a pivotal knob 13 which may have a knurled edge and is secured in the center on the lower seat edge. By a manipulation of the right hand in the forward direction the driver can rotate the knob 13, when required also during travel. This pivotal knob is provided with a screwthreaded pin 15, in such manner that the pin 15 passes through a transverse spar 12 and is at the same time in engagement with a screwthreaded sleeve 14 secured in such manner as to be axially non-displaceable on the spar 12. It is apparent in detail from FIG. 3 that as axial stops, use can be made of known snap rings 17 or other ring clamping elements. A downwardly directed end 20 of the adjustment spring 19 is connected in appropriate manner with the end 16 of the pin 15, for example, in such manner that it is forked and thus engages over the end 16, or in some other suitable way. By means of pins, dowels or the like 18, 18a. the spring end 20 is secured axially relatively to the pin end, i.e. if the knob 13 is rotated the pin rotates away from the transverse spar 12 or draws nearer to it, depending on the direction of rotation. As this is done, the spring end 20 is entrained and the substantially horizontally extending portion, extending to the rear in the seat space, is adjusted. The spring is pivoted at a central curved portion 21 thereof journaled about a stationary pivot bearing 22 (FIGURE 3) whereby a retaining plate 24 carried by the spring is adjusted upwardly or downwardly. The retaining plate is provided with a friction or roller bearing, so that it is able to move to and fro along the spring 19. By providing an adequate hollow spacing between an inner space in the plate 24 (FIG. 2) and the spring 19 extending through it, it is possible in individual cases to do without the use of a bearing and to manufacture the article with an additional saving of costs. The pivot bearing 22 is, with the aid of bearing-retaining means, which may consist of a welded-on metal sheet 23, rigidly secured on the transverse spar 12.

It will be seen from FIGS. 1 and 2 that the adjustment device is provided with separate supporting parts for adjustment of the spring stiffness. First of all, the design can be such that a supplementary upwardly directed effect of supporting or auxiliary springs 26 is available only in a predetermined zone. These supporting springs can be helical springs or it is also possible to use a leaf spring. One or more supporting springs can be used. The arrangement of the supporting springs is generally such that a supporting plate 25 is provided and is arranged rigidly between the retaining plate 24 and the spring or springs 26. The supporting plate 25 can have the shape of a narrow rectangle, so that the springs 26 also are effective in this zone. The arrangement can, however, also be such that the retaining plate 24 is made considerably larger.

If, by rotating the knob 13, the spring end 20 is adjusted rearwardly or forwardly, the adjustment spring 19, which is substantially horizontal but has an upwardly curved end, presses the spring 26 in the one case upwardly towards the seat surface, this being equivalent to a raising of the seat surface 10 and therewith to an increase in spring stiffness. In the other case, the springs 26 are lowered, and this is equivalent to formation for example of a trough and therewith of lower spring stiffness or an increased spring softness. Thus, the softness of the seat cushion can be adjusted as desired.

An especially simplified embodiment shown in FIG. 4 involves the use of a moulded member with a knob 13a and a pin part 16a, guided in the nut screwthread 14a of a projection 30. The projection projects directly from a transverse spar 12a which is for example round, the transverse spar being furthermore provided with a pivot bearing. Arranged on the said pivot bearing is a metal section, for example, an angle section 31 on the upper end of which the substantially horizontally extending part of the adjustment spring 19a is received. The end of the pin 16a is continuously in abutment with the section 31, even when the seat cushion is not used, due to the weight of the cushion itself. By rotating the knob 13a either to the left or to the right, the metal section 31 is displaced rearwardly or forwardly, depending on the direction of rotation, the spring 19a is entrained and therewith the retaining plate 24 is upwardly or downwardly adjusted.

If, in some cases, it is necessary to achieve special fine adjustment of the spring stiffness, it is possible to use a pivoting part with a knob 13b and a pin part 16b which is secured in such manner as to be axially non-displaceable on a transverse spar 12b of the seat frame, by means of a snap ring 17b or the like, so that only a through-passage aperture is provided in the transverse spar as shown in FIG. 5. On the rearward portion of the pin is a nut part 32 having an internal screwthread 14b. In the nut part is, furthermore, a vertically extending slot through which the end 20b of the adjustment spring can be pushed (FIGS. 5 and 6). The spring end can be forked-shaped so that it engages the pin 16b. If the knob 13b is rotated, the nut part 32 is displaced forwardly or rearwardly. The spring end is entrained with it and the spring itself is pivoted about a corresponding bearing and the substantially horizontal spring part carries out a pivoting movement with a vertical component, so that again the retaining plate 24 and the supporting spring 26 are upwardly or downwardly adjusted. Furthermore, the securing of the said supporting springs 26 can be such that they are secured at the upper end on the undulating springs (not shown) of the seat cushion, by means of clips or the like. It is expedient to form the through-passage for the spring 20b, at the lower end of part 32 as shown in FIG. 5, so as to provide more space for the pivoting movement. The central part of the adjustment spring is pivoted by a central curved portion (unnumbered) of the spring itself so that it is unnecessary to provide special retaining means on the bearing.

The invention is not limited to the above-discussed constructional examples. Thus, it is possible to do without the supporting springs 26 altogether, to cause the inwardly directed part of the adjustment spring to extend with a higher curve, and to carry the retaining plate 24 directly up to a point below the seat surface 10. The retaining plate 24 or the supporting plate 25 is, in this case, provided with a layer of yielding material, for example, foam rubber.

Figure 8:
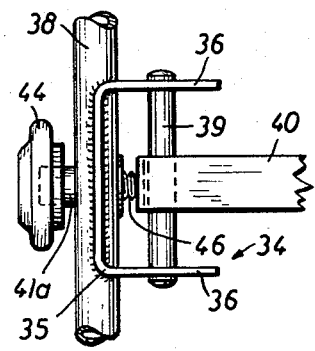

In the embodiment according to FIGS. 7 and 8, the mounting for the adjustment spring 40 and for the adjustment device 33 consists of a U-shaped supporting member 34 which has a front plate 35 and two side plates 36, all three plates forming a single piece. The front plate 35 is provided at a suitable place with a recess 37 which is engaged by a transverse spar 38 of the seat cushion. The supporting member 34 may be connected with the transverse spar 38 in any suitable manner, preferably by welding. Between the side plates 36 is a rod 39, and adjustment spring 40 is pivotally mounted thereon.

The adjustment device 33 consists of a sleeve 41 which has a flange 42 and is secured against axial displacement by a collar 43 threaded on the sleeve 41 or fixed thereon in any other manner, the front plate 35 being engaged between flange 42 and collar 43. Therefore, sleeve 41 may be rotated, and on the square end 41a thereof is mounted a handwheel 44. The inner side of sleeve 41 is provided with a thread 45 which is engaged by screw-bolt 46. The handwheel 44 is fixed in axial direction by screw 47 mounted in a recess 48 which is covered by a cap 49 inserted therein.

The end 40a of adjustment spring 40 is pivotally connected with the end of screw-bolt 46 by inserting the end 40a in a bore 50 of screw-bolt 46. By operation of handwheel 44, sleeve 41 which cannot be displaced in axial direction is rotated in the one or the other sense so that also screw-bolt 46 is adjusted in the one or the other sense. Simultaneously, adjustment spring 40 is pivoted around rod 39.

At the end of adjustment spring 40 may be pivotally mounted a plate 51 which supports the seat surface of seat 52.

The pivotal mounting is effected by means of a U-shaped angle member 53 which is connected with plate 51 by rivets, welding or the like. Between the side plates of angle member 53 is provided a pin 54 which is engaged by the end of adjustment spring 40. Between the plate 51 and the seat surface of seat 52 may be provided in the usual manner suitable upholstered layers of foam rubber or the like.

What is claimed is:

1. A spring supported upholstered seat comprising a seat, adjustment spring means having first and second end portions, pivot means pivotally supporting said adjustment spring means, and adjusting means for adjustably pivoting said adjustment spring means through said first end portion and urging the second end portion constantly beneath and against the seat in a vertical direction at a predetermined force to affect the cushioning characteristics of the seat.

2. The seat defined in claim 1 wherein said adjustment spring means is mounted within said seat, and wherein said means for pivotally supporting the adjustment spring means is so mounted that a horizontal adjustment of a portion of said adjustment spring means results in a vertical modification in the position of said auxiliary spring.

3. The seat defined in claim 2 further comprising a manually operable member for adjusting said adjustment spring means horizontally, said member comprising a rotatably mounted knob.

4. The seat defined in claim 3 further comprising a substantially rigid frame for said seat, a threaded sleeve mounted on said frame, and a threaded pin inserted in said sleeve with one end connected to said knob, said pin being coupled to said adjustment spring means so that as said knob is rotated said pin adjusts the position of said adjusting means by pivoting the same about the pivot means.

5. The seat defined in claim 4 wherein said sleeve is mounted on said frame for rotation but not for axial movement, said pin moving in said sleeve axially as it is rotated.

6. The seat defined in claim 4 further comprising a substantially rigid plate supported by the free end of said member, said plate in turn supporting said spring means.

7. The seat defined in claim 6 wherein the end of said member adjacent said pin is bifurcated and surrounds said pin, and further comprising means mounted on said pin for maintaining said bifurcated end of said member in a relatively fixed axial position on said other end of said pin.

References Cited in the file of this patent

UNITED STATES PATENTS

| 1,264,265 | Brusius | Apr. 30, 1918 |
| 2,542,366 | Scott | Feb. 20, 1951 |
| 2,937,641 | Oetinger | May 24, 1960 |
| 2,991,124 | Schwarz | July 4, 1961 |

FOREIGN PATENTS

| 170,648 | Sweden | Mar. 8, 1960 |

UNITED STATES PATENT OFFICE
CERTIFICATE OF CORRECTION

Patent No. 3,178,221　　　　　　　　　　　　　　April 13, 1965

Johann Schwarz

It is hereby certified that error appears in the above numbered patent requiring correction and that the said Letters Patent should read as corrected below.

In the heading to the printed specification, after line 4, insert -- Claims priority, application Germany, Sept. 26, 1961, Sch 30,091 --.

Signed and sealed this 24th day of August 1965.

SEAL)
ttest:

:RNEST W. SWIDER　　　　　　　　　　　　　EDWARD J. BRENNER
ttesting Officer　　　　　　　　　　　　　　Commissioner of Patents